United States Patent [19]
Netto

[11] 4,026,536
[45] May 31, 1977

[54] SUPPORTING AND DRIVE SYSTEMS FOR X-Y TABLE

[76] Inventor: Daniel J. Netto, 518 S. Carondelet St., Los Angeles, Calif. 90057

[22] Filed: Dec. 1, 1975

[21] Appl. No.: 636,968

[52] U.S. Cl. ............................................... 269/73
[51] Int. Cl.² .......................................... B23Q 1/02
[58] Field of Search ................. 269/55, 58, 61, 71, 269/73; 51/240 R; 90/58; 308/3 A, 6

[56] References Cited

UNITED STATES PATENTS

| | | | |
|---|---|---|---|
| 3,124,018 | 3/1964 | Gough | 51/240 R |
| 3,143,791 | 8/1964 | Lanahan et al. | 269/55 |
| 3,499,642 | 3/1970 | Porter | 269/71 |
| 3,777,616 | 12/1973 | Mueller | 308/6 R |

*Primary Examiner*—Al Lawrence Smith
*Assistant Examiner*—Robert C. Watson
*Attorney, Agent, or Firm*—Harris, Kern, Wallen & Tinsley

[57] ABSTRACT

A supporting system for an *x-y* table comprising four pairs of superimposed and interconnected upper and lower bearings arranged in a pyramidal array. More particularly, the pairs of bearings are located at the corners of a rectangle with the uppermost bearings of the pairs perpendicular to the lowermost bearings thereof, and with the uppermost bearings of the pairs offset horizontally inwardly relative to the lowermost bearings of the pairs in both the *x* and *y* directions, thereby producing the pyramidal array mentioned. With such a bearing array, the weight of the table, and any load thereon, act to preload all of the bearings so that there is zero play in both the *x* and *y* directions. Also disclosed is a drive system for an *x-y* table comprising two-speed *x* drive means for driving the table in the *x* directin and two-speed *y* drive means for driving the table in the *y* direction, each drive means including selectively operable high and low speed drive members. Antibacklash gearing in the *x* and *y* drive means eliminates play therein.

7 Claims, 14 Drawing Figures

SUPPORTING AND DRIVE SYSTEMS FOR X-Y TABLE

BACKGROUND OF INVENTION

The present invention relates in general to x-y tables and, more particularly, to supporting and drive systems for x-y tables. Such tables are widely used in a variety of equipment to achieve accurate positioning of a workpiece, a subject to be viewed, or the like, such items hereinafter being referred to as the load on the table. Examples of equipment utilizing x-y tables include milling machines, microscopes, measuring apparatus, to name but a few.

One typical prior x-y table supporting system comprises two parallel x tracks and two parallel y tracks arranged in perpendicular relation, one pair of tracks being movable with the table and the other being stationary. Such a supporting system further includes four x bearings, two of which are spaced apart along one of the x tracks and the other two of which are spaced apart along the other of the x tracks, and four y bearings, two of which are spaced apart along one of the y tracks and the other two of which are spaced apart along the other of the y tracks. The respective x and y bearings are interconnected and superimposed to provide four pairs of interconnected, superimposed bearings each of which pairs comprises one x bearing and one y bearing. The bearing pairs are movable along one of the pairs of tracks, while the other pair of tracks is movable relative to the bearing pairs and with the table. Normally, the bearings of each pair are directly superimposed, i.e., the centers of the bearings of each pair are spaced apart along a vertical line. Suitable x and y drive means are provided for driving the table in the x and y directions.

OBJECTS AND SUMMARY OF INVENTION

With the foregoing background in mind, a primary object of the invention is to provide an x-y table supporting system wherein the bearings are arranged in a pyramidal array with the centers of the upper bearings of the various pairs offset horizontally inwardly relative to the lower bearings thereof in both the x and y directions.

With the foregoing offset bearing construction, the weight of the table and of any load thereon apply a pyramidal force pattern to the bearing pairs in such a manner that the supporting system is preloaded in both the x and y directions so as to completely eliminate play, which is an important feature of the invention. More particularly, a force component is applied to the upper bearing of each pair tending to force it laterally outwardly against its track, and a similar force component is applied to the lower bearing of each pair tending to force it laterally outwardly against its track also. Thus, the pyramidal force pattern produced by the table weight, and the weight of any load thereon, acts to preload all of the bearings horizontally outwardly against their respective tracks, which completely eliminates play, an important feature of the invention.

Turning to another aspect of the invention, an important object is to provide a drive system for an x-y table comprising two-speed x drive means for driving the table in the x direction and two-speed y drive means for driving the table in the y direction. With this construction, the load on the table can be positioned at the desired location quickly and accurately.

More particularly, an object of the invention is to provide, and the invention may be summarized as comprising, a two-speed x or y drive means which includes: a drive shaft; concentric high and low speed drive members coaxial with the drive shaft; a slip clutch connecting the high speed drive member to the drive shaft; means mounting the low speed drive member for movement axially of the drive shaft between operative and inoperative positions; a fixed ring gear coaxial with the drive members; a planetary gear carried by the low speed drive member and adapted to mesh with the ring gear when the low speed drive member is in the operative position; and means providing a driving connection between the low speed drive member and the drive shaft when the planetary gear is meshed with the ring gear.

Another object is to utilize antibacklash components throughout the x and y drive means to eliminate play.

The foregoing objects, advantages, features and results of the present invention, together with various other objects, advantages, features and results which will be evident to those skilled in the art to which the invention relates in the light of this disclosure, may be achieved with the exemplary embodiment of the invention illustrated in the accompanying drawings and described in detail hereinafter.

DESCRIPTION OF DRAWINGS

FIG. 12 is a transverse sectional view taken as indicated by the arrowed line 12—12 of FIG. 11, the plane in which FIG. 11 is taken being indicated by the arrowed line 11—11 of FIG. 12.

DESCRIPTION OF EXEMPLARY PRIOR ART

Figure 1:
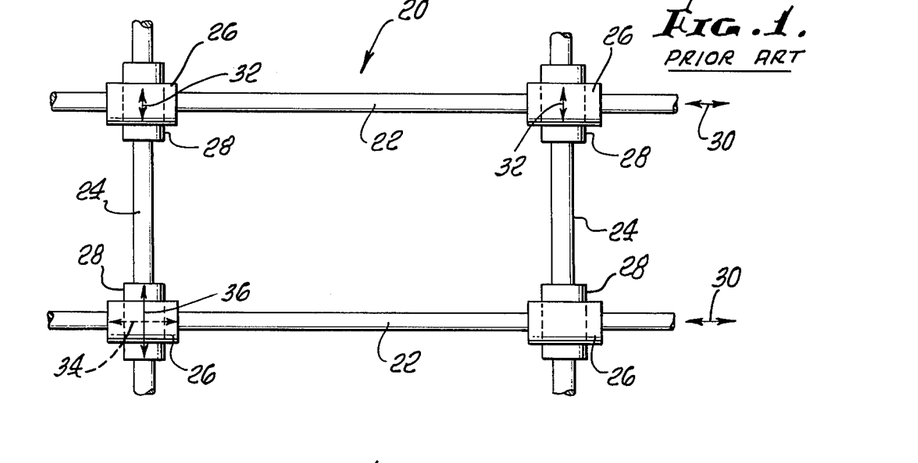
FIG. 1 is a diagrammatic plan view showing a supporting system for an x-y table which is illustrative of the prior art.

Referring to FIG. 1 of the drawings, illustrated therein in diagrammatic fashion is an illustrative supporting system 20 for an x-y table which, for convenience, is not shown. The supporting system 20 includes parallel x tracks 22 and parallel y tracks 24 arranged in perpendicular relation. Spaced apart along the x tracks 22 are x bearings 26 and spaced apart along the y tracks 24 are y bearings 28. In the particular construction illustrated, the x tracks 22 are movable with the x-y table, not shown, as indicated by the double-headed arrows 30. With this construction, the respective x bearings 26 are located above the respective y bearings 28, the y tracks 24 being stationary. The respective x bearings 26 are connected to the respective y bearings 28 to provide superimposed, interconnected bearing paris at the respective corners of a rectangle defined by the bearing pairs. The pairs of bearings 26 and 28 and the x tracks 22 are movable back and forth along the stationary y tracks 24, as indicated by the double-headed arrows 32.

Thus, as is typical of an x-y table supporting system of the general nature indicated by the supporting system 20, a load on the x-y table, not shown, may be positioned at the desired station by successive and/or concurrent displacements of the x tracks 22 and of the pairs of bearings 26 and 28, and the x tracks 22, along the y tracks 24.

In the illustrative prior art supporting system 20, the bearings 26 and 28 are directly superimposed. In other words, the center of the bearing 26 of each pair is located directly above the center of the bearing 28 thereof, such centers thus being spaced apart along a vertical line. With this prior art construction, the weight of the x-y table, not shown, carried by the x tracks 22, and the weight of any load on the x-y table, act in the downward direction only with respect to the four pairs of bearings 26 and 28. Thus, there is no lateral, i.e., horizontal, preloading of the bearings 26 and 28 relative to their respective tracks 22 and 24, or vice versa. Consequently, play can exist in both the x and y directions, as indicated by the arrows 34 and 36 in the lower left corner of FIG. 1 of the drawings. Conventionally, such x and y play is minimized by various mechanical or other expedients, such as spring loading, but can never be completely eliminated, which is undesirable since it affects the accuracy of positioning of the load on the x-y table.

DESCRIPTION OF EXEMPLARY EMBODIMENT OF INVENTION

Figure 2:
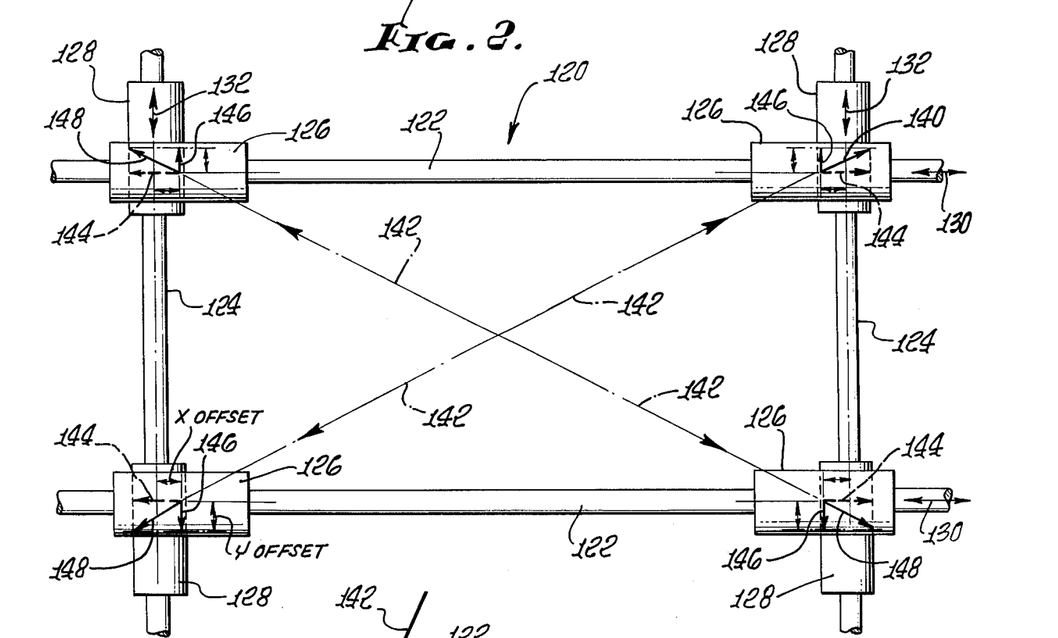
FIG. 2 is a view similar to FIG. 1, but showing the supporting system of the present invention.
Figure 3:
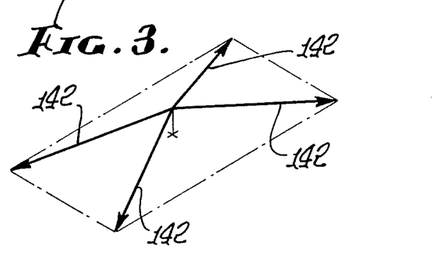
FIG. 3 is a diagrammatic view showing the pyramidal force arrangement produced by the table weight and load with the present invention, such pyramidal force arrangement also being shown in plan in FIG. 2.
Figure 3A:
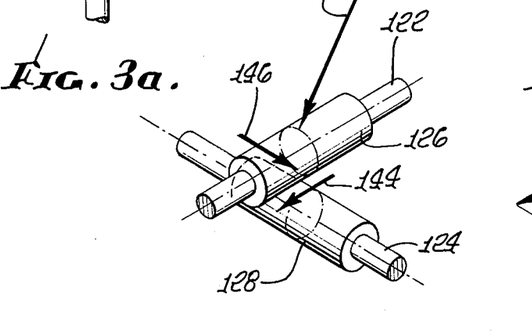
FIG. 3a is a fragmentary isometric view showing in more detail than FIG. 2 the effect of one pyramidal force vector in producing bearing preloading force components.

Illustrated schematically in FIGS. 2, 3 and 3a of the drawings, and in more detail in FIGS. 4 to 10 thereof, is a supporting system 120 of the invention which utilizes the weight of an x-y table 140, FIGS. 4 to 10, in such a way as to preload x bearings 126 and y bearings 128 relative to their respective x tracks 122 and y tracks 124 as to completely eliminate play in the x and y directions. The x and y tracks 122 and 124 and the x and y bearings 126 and 128 have generally the same relationships as the x and y tracks 22 and 24 and the x and y bearings 26 and 28, except for important differences which will be discussed in more detail hereinafter. The various components of the supporting system 120 are subject to motions designated by the double-headed arrows 130 and 132 which are similar to the motions designated by the double-headed arrows 30 and 32.

The important feature of the supporting system 120 of the invention is that the centers of the upper bearings of the respective pairs, in this case the x bearings 126, are offset horizontally inwardly relative to the centers of the lower bearings of such pairs in both the x and y directions, the x and y offsets being designated by legends in the lower left corner of FIG. 2, and by similar legends in various of FIGS. 4 to 10. Since the x bearings 126 are horizontally offset inwardly in both the x and y directions relative to the respective y bearings 128, the result is a pyramidal bearing array. More particularly, if the centers of the lower, y bearings 128 are regarded as forming the corners of the base of a pyramid, the centers of the upper, x bearings 126 lie generally on, or at least adjacent, pyramid edges converging upwardly to an apex from the corners of the pyramid base. The apex of the pyramid is located on a vertical line through the center of the x-y table 140.

With the foregoing horizontally inward offset of the upper bearings 126 relative to the respective lower bearings 128, the weight of the x-y table 140, and of any load thereon, produce a pyramidal force array acting downwardly and outwardly on the pairs of bearings 126 and 128, as indicated by the vectors 142 in FIGS. 2, 3 and 3a. As indicated in FIGS. 2 and 3a, each downwardly and outwardly acting vector 142 produces x and y components 144 and 146 having a resultant 148. As perhaps best shown in FIG. 3a, each x vector component 144 biases the corresponding y bearing 128 horizontally outwardly relative to the corresponding y track 124 to preload same. Similarly, each y vector component 146 biases the corresponding x bearing 126 horizontally outwardly against the corresponding x track 122 to preload same. Such horizontally outward preloading of the various x and y bearings 126 and 128 completely eliminates horizontal play from the supporting system 120, which is the essential feature of this system.

Figure 4:
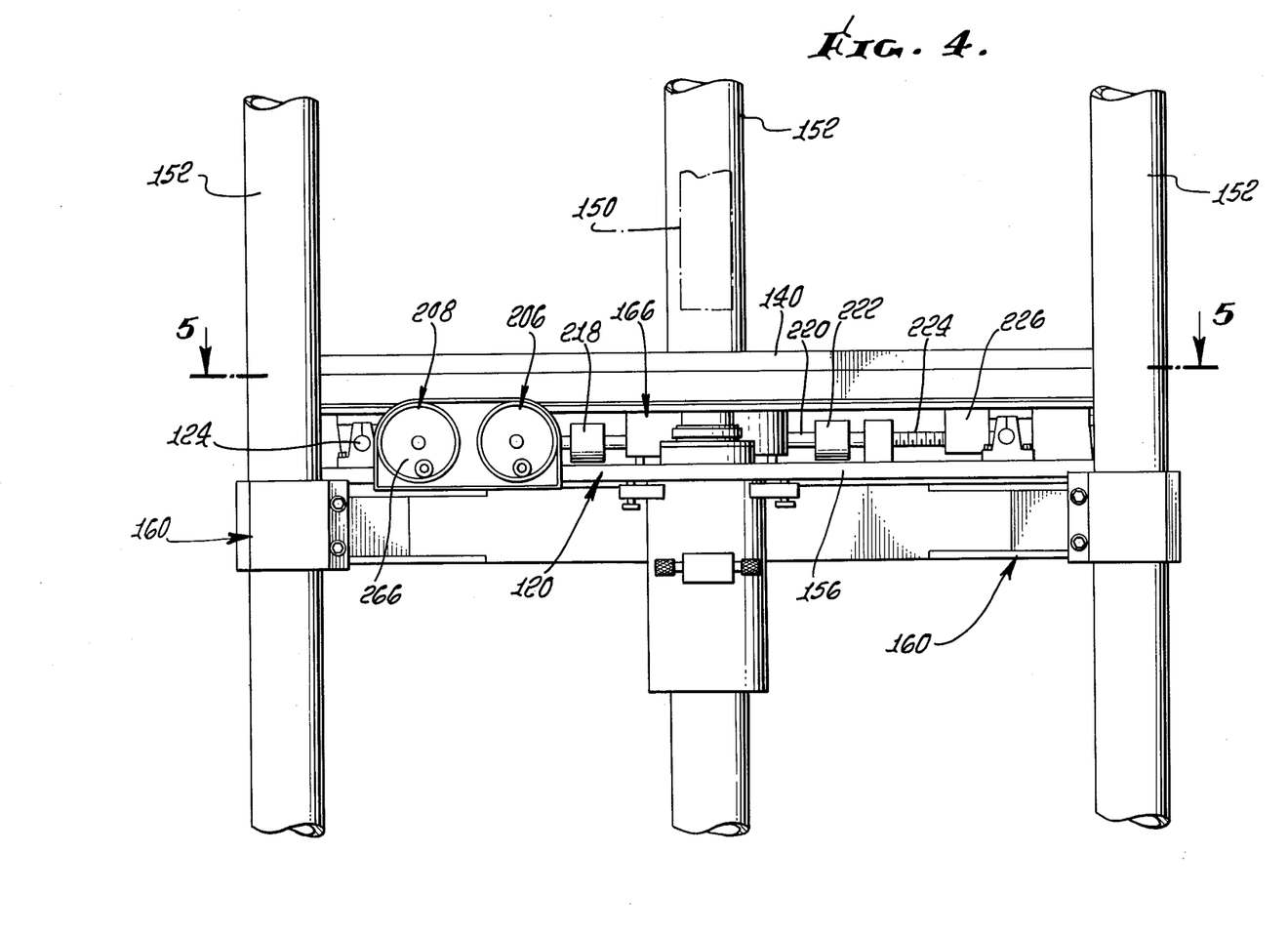
FIG. 4 is a fragmentary view showing, in side elevation, an x-y table which embodies the invention.

Turning now to FIG. 4 of the drawings, the x-y table 140 and its supporting means or system 120 of the invention, are shown fragmentarily in a microscope environment merely for purposes of illustration. More particularly, the x-y table 140 and its supporting system 120 are shown as mounted for vertical movement relative to a microscope 150 along uprights 152. It will be understood, however, that the x-y table supporting system 120 of the invention may be utilized in a wide variety of other environments, and is not limited to the specific microscope environment shown in FIG. 4.

Figure 6:
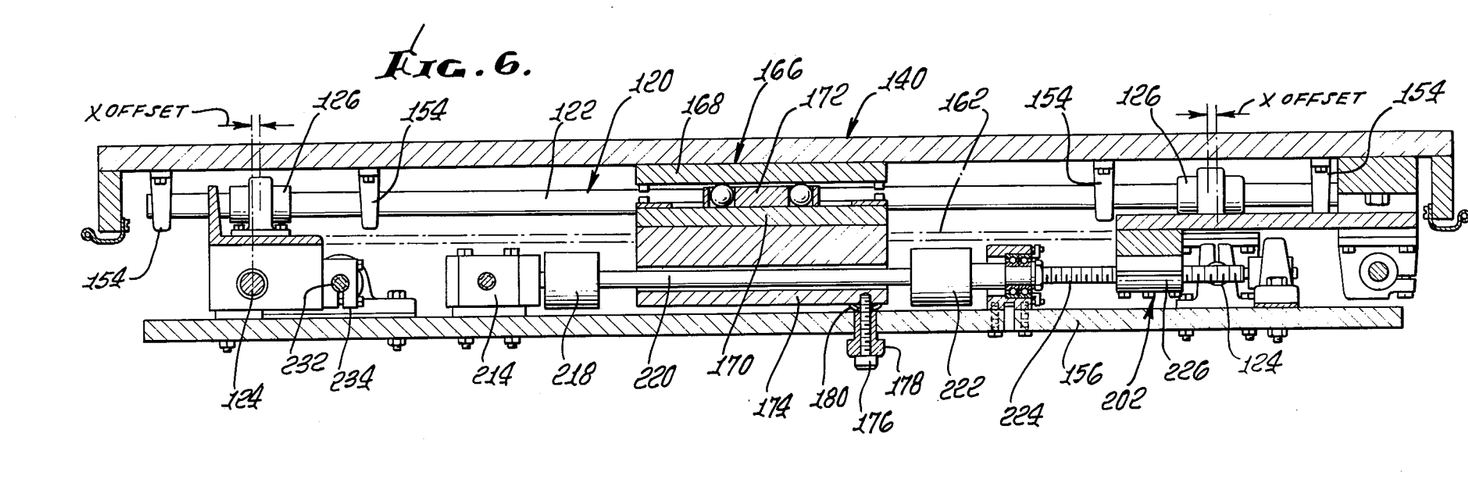
FIGS. 6, 7, 8, 9 and 10 are sectional views respectively taken as indicated by the arrowed lines 6—6, 7—7, 8—8, 9—9 and 10—10 of FIG. 5.
Figure 7:
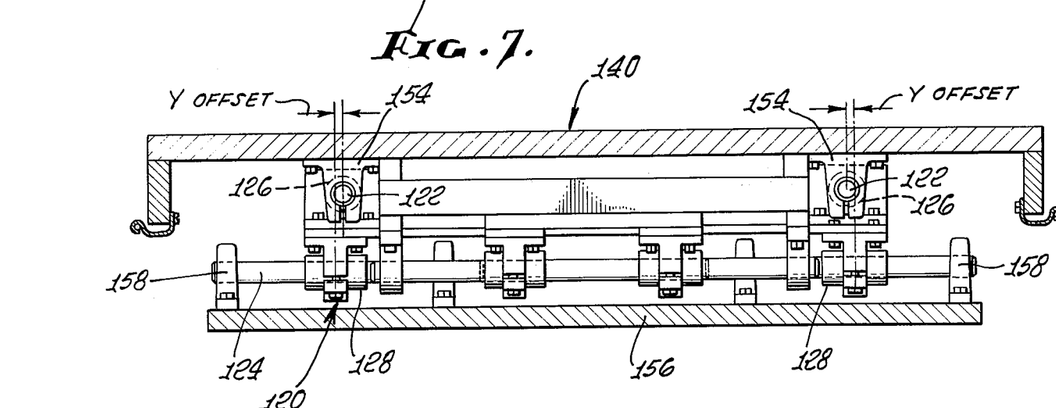
Figure 8:
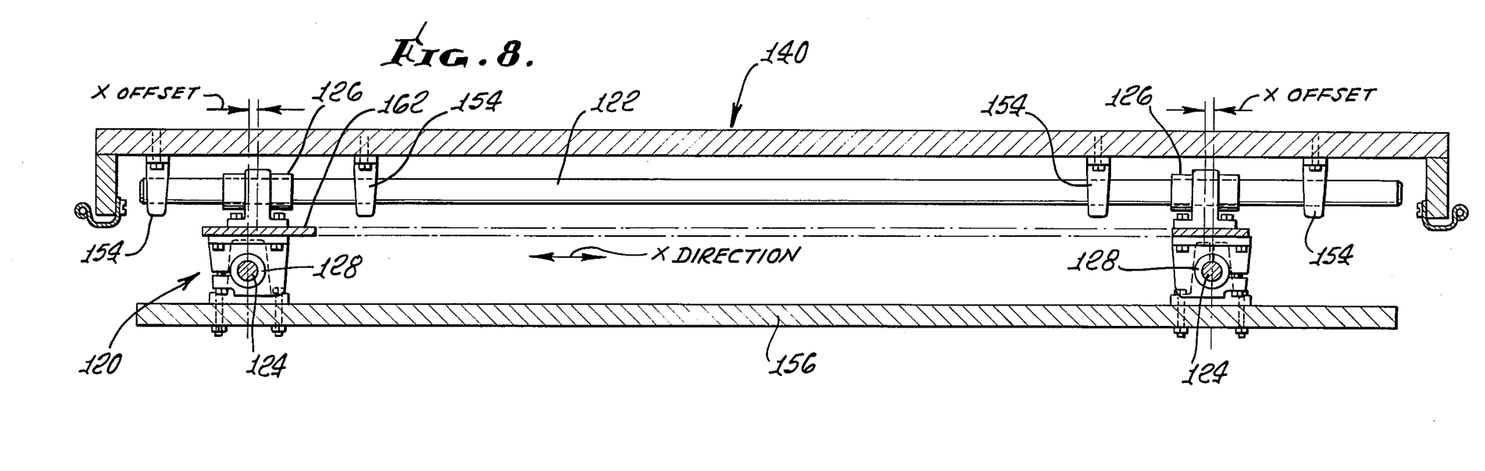

Considering the supporting system 120 in more detail now, the x tracks 122, which are preferably cylindrical rods, are fixed to the under side of the x-y table 140 in spaced, parallel relation, as by clamp brackets 154, best shown in FIGS. 6 to 9. The respective x bearings 126 and y bearings 128 are suitably interconnected, as by bolting, as best shown in FIGS. 7 and 8. The x and y bearings 126 and 128 are bolted, or otherwise connected, together with the x bearings 126 horizontally offset inwardly in both the x and y directions relative to the respective bearings 128, as hereinbefore discussed in detail.

Figure 5:
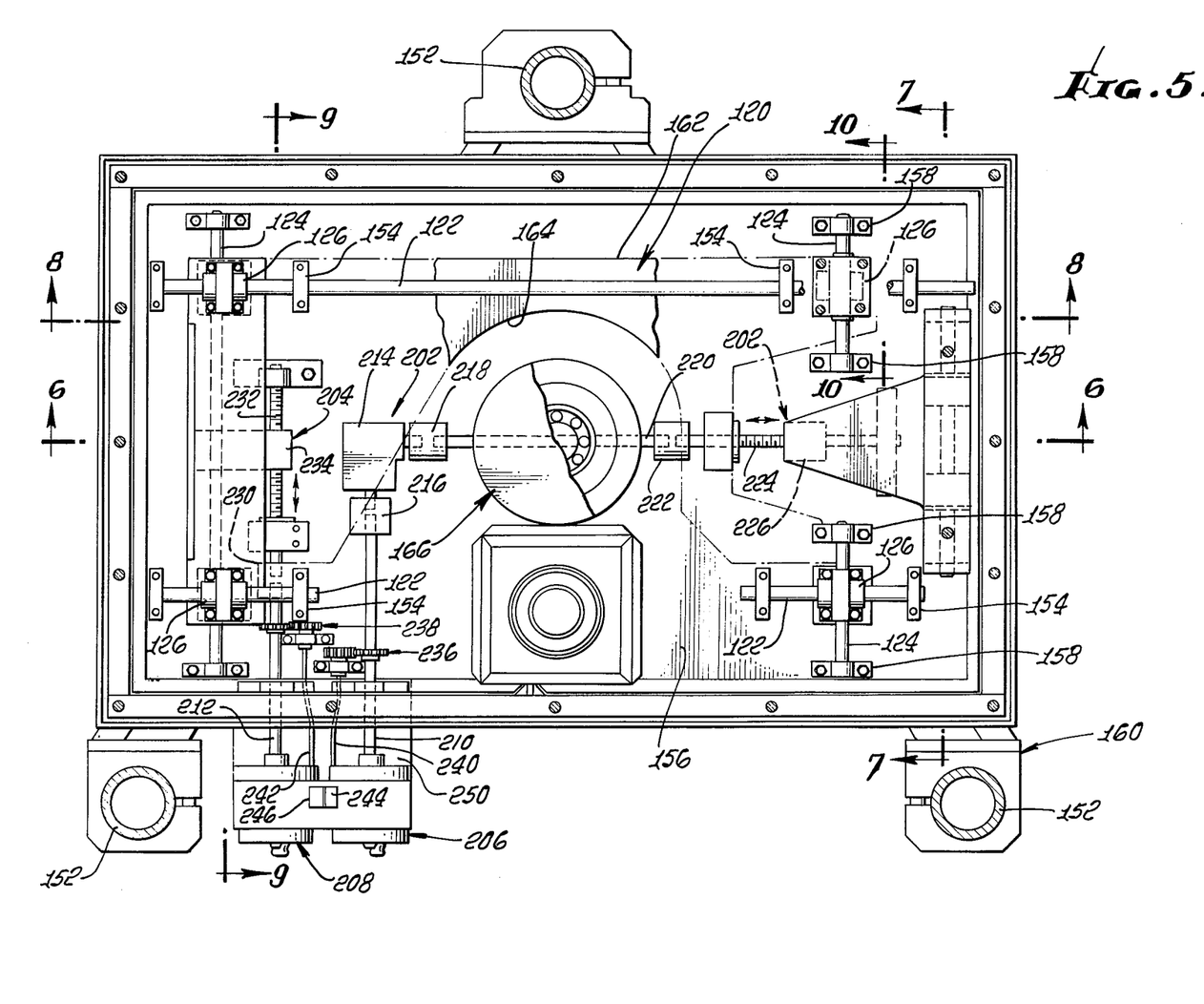
FIG. 5 is a plan view taken as indicated generally by the arrowed line 5—5 of FIG. 4, and with parts broken away to reveal parts therebeneath.
Figure 10:
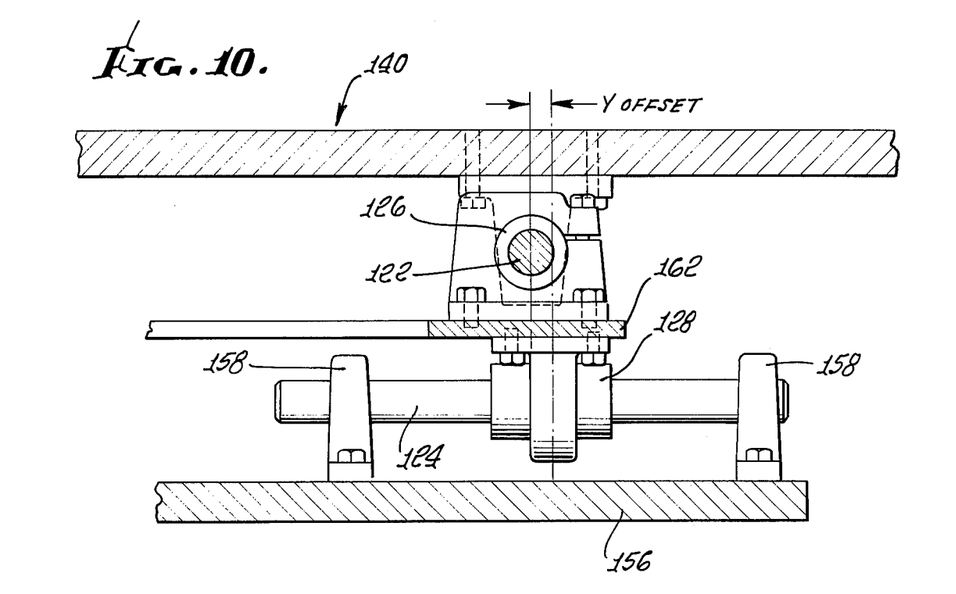

The y tracks 124, which are also preferably cylindrical rods, are mounted in spaced, parallel relation on the upper surface of a base plate 156 by means of clamp brackets 158 secured to the base plate, as best shown in FIGS. 7 and 10. Referring particularly to FIGS. 5 and 10, the left y track 124 is a single, continuous track, whereas the right y track 124 is discontinuous, being divided into two axially spaced, but axially aligned, components to provide clearance for other parts of the apparatus. However, the right y track 124 could also be continuous. The base plate 156 is carried by a suitable mounting structure 160, FIGS. 4 and 5, movable vertically along the uprights 152.

The pairs of bearings 126 and 128 at the left of the supporting system 120, as viewed in FIG. 5, and the pairs of bearings 126 and 128 at the right of the supporting system, are interconnected by an interlocking plate 162. This plate is secured to the left bearing pairs and the right bearing pairs in any suitable manner, as by bolting, as shown, for example, in FIGS. 8 and 10. The purpose of this interlocking plate 162 is to make certain that the left pairs of bearings 126 and 128 and the right pairs of bearings 126 and 128 cannot shift relative to each other. To further insure this, the interlocking plate 162 is preferably bowed slightly in the x direction so that it acts to some extent as a spring biasing the left pairs of bearings and the right pairs of bearings apart. To provide space for a thrust bearing structure which will be described in the next paragraph, the interlocking plate 162 is centrally notched, in the x direction, as best shown in FIG. 5.

To prevent damage to the supporting system 120 in the event that a heavy load is accidentally dropped onto the x-y table 140, a shock-absorbing thrust bearing assembly 166, best shown in FIG. 6, is provided. This assembly 166 includes an upper plate 168 mounted on the lower side of the x-y table 140 and includes a lower plate 170 spaced below the upper plate 168. The adjacent surfaces of the plates 168 and 170 are ground and separated by a thrust bearing 172. The lower plate 170 is carried by a support 174 which is resiliently mounted on the base plate 156 to absorb any shock of the nature indicated. More particularly, threaded into the support 174 are three screws 176 spaced 120° apart, only one being visible in FIG. 6. Each screw 176 extends through a guide 178 extending through a hole in the base plate 156 and is movable vertically relative to the base plate, either by making the screw itself movable relative to the guide in the vertical direction, or by making the guide movable relative to the base plate. In either event, the support 174 is biased upwardly by a disc spring 180 surrounding each screw 176. With this construction, any load dropped onto the x-y table accidentally causes the disc springs 180 to yield to absorb shock, thereby preventing damage to the supporting system 120.

Turning now to the drive system of the invention for the x-y table 140, such drive system includes, as shown generally in FIG. 5 of the drawings, a two-speed x drive means 202 for driving the table in the x direction and a two-speed y drive means 204 for driving the table in the y direction. The x drive means 202 and the y drive means 204 respectively include two-speed x and y drive units 206 and 208, which are identical. The two-speed x and y drive units 206 and 208 respectively have x and y output drive shafts 210 and 212 forming parts of the x and y drive means 202 and 204. The x and y drive means 202 and 204 are suitably mounted on the base plate 156.

More particularly, the x drive means 202 includes, as shown in FIGS. 5 and 6, a right angle drive unit 214 having its input shaft connected to the output shaft 210 of the x drive unit 206 by an antibacklash coupling 216. Another antibacklash coupling 218 connects the output shaft of the right angle drive unit 214 to a shaft 220 extending in the x direction. The shaft 220 is connected, by another antibacklash coupling 222, to an x lead screw 224 threaded through an x nut 226 suitable connected to the x-y table 140, as best shown in FIG. 6. Thus, actuation of the two-speed x drive unit 206 drives the x-y table 140 in the x direction by rotating the x lead screw 224 within the x nut 226, through the intervening connections described.

Figure 9:
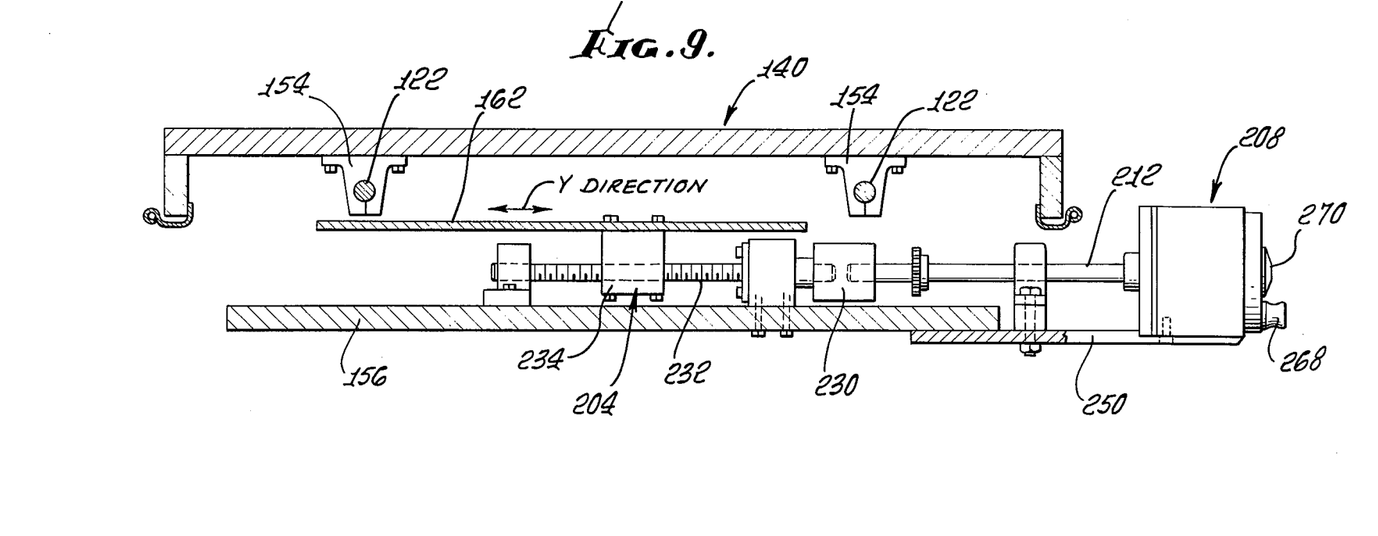

The output shaft 212 of the two-speed y drive unit 208 is connected, through an antibacklash coupling 230, FIGS. 5 and 9, to a coaxial y lead screw 232 threaded through a y nut 234, the latter being suitably mounted on the bearing interlocking plate 162 of the supporting system 120, as shown in FIG. 9. Thus, the two-speed y drive unit 208 drives the x-y table 140 in the y direction through the y lead screw 232 and the y nut 234, through the intervening connections described.

As previously indicated, the x and y drive means 202 and 204 utilize antibacklash couplings throughout. Additionally, these drive means utilize antibacklash gearing throughout. Also, the x and y lead screws 224 and 232 are mounted in bearings which prevent axial movement of these lead screws. Thus, play in the x and y drive means 202 and 204 is virtually eliminated.

Referring to FIG. 5, gearing 236 and 238 interconnects the x and y output shafts 210 and 212 to cables 240 and 242 respectively driving x and y indicators 244 and 246, which may be of the counter type. The indicators 244 and 246 serve to show the position of the x-y table 140, preferably in millimeters. Also, as shown in FIG. 11, each output shaft carries a disc 213 provided with a peripheral scale cooperating with a peripheral scale on a fixed disc 215 to provide an accurate slow mode readout, preferably in micrometers.

The two-speed x and y drive units 206 and 208 are located on a forward extension 250 of the base plate 156 at the front of the apparatus so that they are readily accessible. Similarly, the indicators 244 and 246 are respectively mounted on the corresponding drive units 206 and 208.

As previously stated, the two-speed x and y drive units 206 and 208 are identical. Consequently, only one of them, viz., the two-speed y drive unit 208, is shown in detail in the drawings, and specifically in FIGS. 11 to 13 thereof. Consequently, only the two-speed drive unit 208 will be described in detail herein, it being understood that the same description applies to the x drive unit 206.

Figure 11:
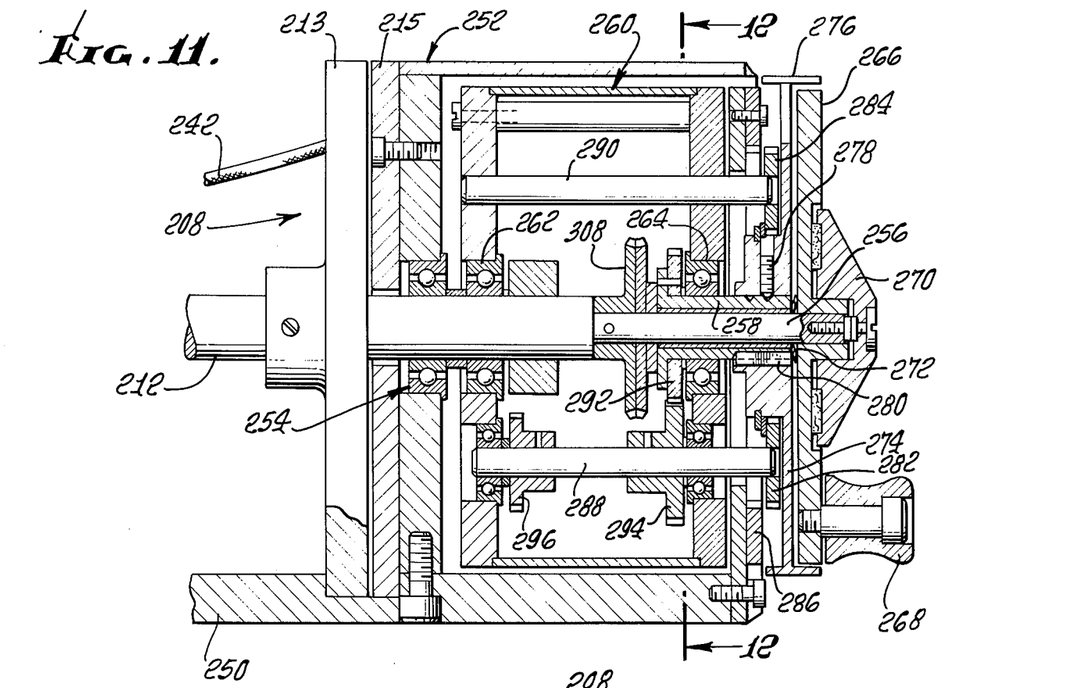
FIG. 11 is a longitudinal sectional view of a two-speed drive means of the invention.
Figure 12:
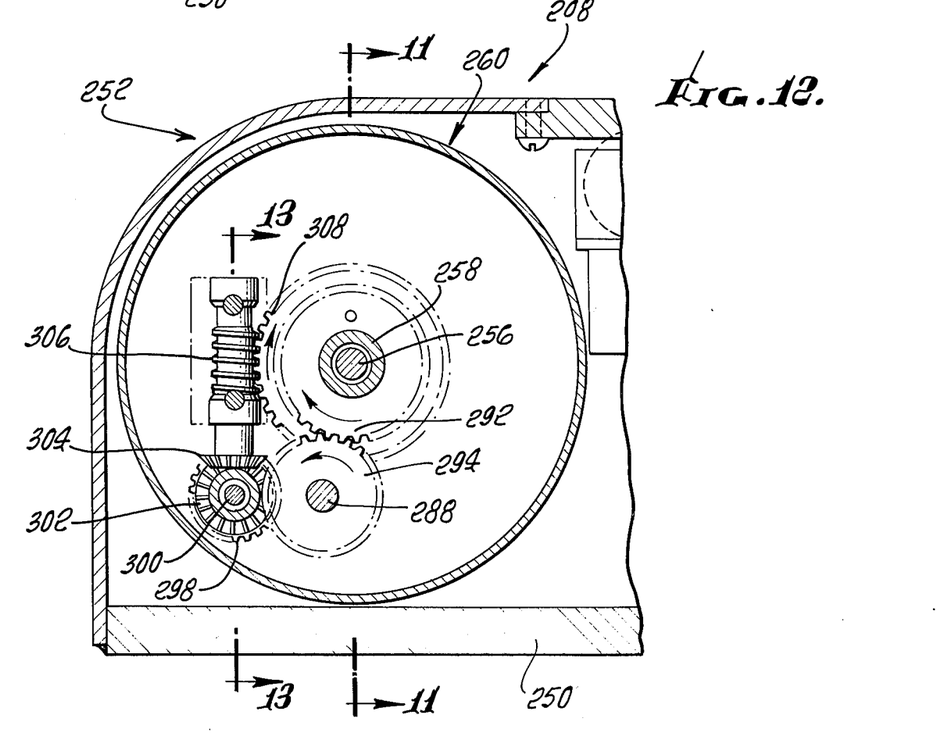
Figure 13:
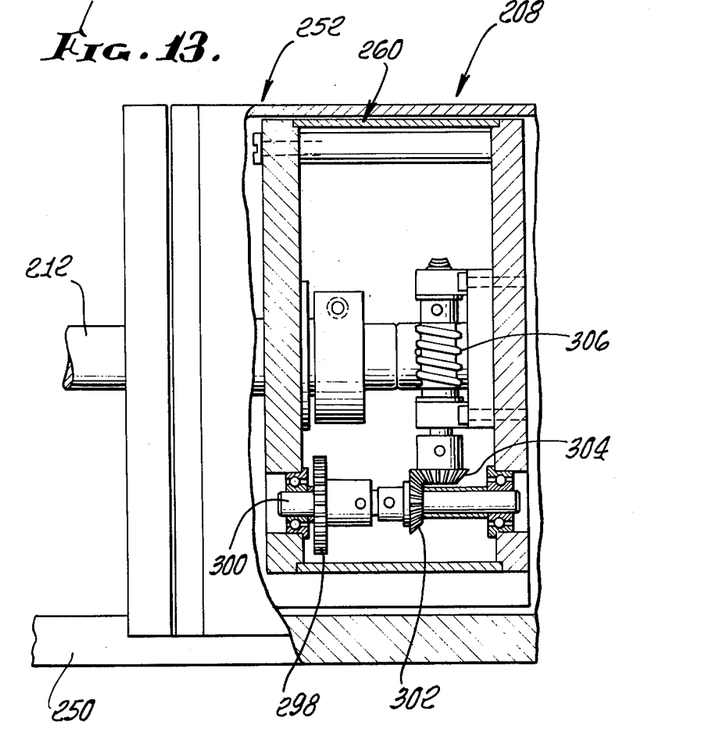
FIG. 13 is a sectional view taken as indicated by the arrowed line 13—13 of FIG. 12 of the drawings.

Referring to FIGS. 11 to 13 of the drawings, the two-speed y drive unit 208 includes a housing 252 from which the y unit output shaft 212 extends. The output shaft 212 is supported by a bearing 254 within the housing 252. Adjacent its forward end, i.e., its right end as viewed in FIG. 11, the shaft 212 has a reduced diameter portion 256 disposed in a rotary bushing 258. A rotary gearbox housing 260 is mounted on the shaft 212 and the bushing 258 by bearings 262 and 264.

Rotatably mounted on the reduced diameter portion 256 of the shaft 212 is a high speed drive member 266 equipped with a knob 268. Secured to the forward end of the reduced diameter portion 256 of the shaft 212 is a clutch disc 270 frictionally engageable with the central portion of the high speed drive member 266. A spring 272 surrounding the shaft portion 256 is seated against the bushing 258 and acts on the high speed drive member 266 to maintain it in frictional engagement with the clutch disc 270. Thus, when the high speed drive of the drive unit 208 is in use, the high speed drive member 266 is directly coupled to the shaft 212 through the friction clutch arrangement described.

Coaxial with and rearwardly of the high speed drive member 266 is a low speed drive member 274 having a flanged outer periphery 276 adapted to be gripped by the operator's fingers. The low speed drive member 274 is mounted on the bushing 258 and is axially movable relative thereto between forward and rearward positions, being held in the desired one of these positions by a spring loaded detent 278. The low speed drive member 274 is shown in its forward position in FIG. 11 of the drawings. In either of its forward or rearward positions, the low speed drive member 274 is keyed to the bushing 258 by a key 280. When the low speed drive member 274 is in its forward position, spur gears 282 and 284 carried thereby are out of engagement with an internal ring gear 286 fixedly mounted on the base plate extension 250. When the low speed drive member 274 is in its rearward position, the spur gears 282 and 284 are meshed with the internal ring gear 286. The spur gears 282 and 284 are respectively axially slidable on shafts 288 and 290 carried by the gear box housing 260.

When the low speed drive member 274 is rotated manually in either direction, it drives a spur gear 292 connected to the bushing 258. The spur gear 292, in turn, drives a spur gear 294 fixed on the shaft 288. Also, fixed on the shaft 288, FIG. 11, is a spur gear 296, FIGS. 12 and 13, fixed on a parallel shaft 300 carried by the gear box housing 260. The shaft 300 drives a bevel gear 302 which, in turn, drives a perpendicular bevel gear 304 connected to a worm 306 suitably mounted in the gear box housing 260. The worm 306, in turn, drives a worm wheel 308 fixed on the reduced diameter portion 256 of the output shaft 212.

Thus, by turning the low speed drive member 266, the output shaft 212 of the drive unit 208 is driven through the gears 292, 294, 296, 298, 302, 304, 306 and 308. Since the spur gears 282 and 284 are meshed with the internal ring gear 286 under such conditions, the foregoing low speed gear train operates without free wheeling of the gear box housing 260. Under the foregoing conditions, any attempt to rotate the high speed drive member 266 merely results in slippage of this member relative to the clutch disc 270.

On the other hand, by moving the low speed drive member 274 forwardly to deactivate the low speed drive by withdrawing the spur gears 282 and 284 from the internal ring gear 286, the high speed drive member 266 can be rotated freely to directly drive the output shaft 212 through the clutch disc 270. Since it is impossible for the worm wheel 308 to drive the worm 306, the low speed gear train is effectively locked so that the gear box housing 260 rotates with the high speed drive member 266 to serve as a flywheel.

An important feature is that access to the drive system may be had very easily by removing the rods 122 to permit removal of the x-y table 140.

Although an exemplary embodiment of the invention has been disclosed for illustrative purposes, it will be understood that various changes, modifications and substitutions may be incorporated in such embodiment without departing from the invention as hereinafter claimed.

I claim as my invention:

1. A supporting system for an x-y table, comprising four pairs of superimposed and interconnected bearings, said pairs of bearings being horizontally spaced apart and respectively located at the corners of a square or rectangle, the upper bearings of said pairs being perpendicular to the lower bearings of said pairs, and the upper bearings of said pairs being offset horizontally inwardly relative to the lower bearings of said pairs in both x and y directions to arrange said upper and lower bearings in a pyramidal array.

2. In a supporting system for an x-y table, the combination of:
 a. two parallel x tracks;
 b. two parallel y tracks perpendicular to said x tracks;
 c. four x bearings two of which are spaced apart along and movable along one of said x tracks and the other two of which are spaced apart along and movable along the other of said x tracks;
 d. four y bearings two of which are spaced apart along and movable along one of said y tracks and the other two of which are spaced apart along and movable along the other of said y tracks;
 e. said x bearings and said y bearings respectively being interconnected and superimposed to provide four pairs of interconnected, superimposed bearings each of which pairs comprises one of said x bearings and one of said y bearings; and
 f. the upper bearings of said pairs being offset horizontally inwardly relative to the lower bearings of said pairs in both the x and y directions.

3. An x-y table supporting system as defined in claim 2 wherein said upper bearings are said x bearings.

4. An x-y table supporting system as defined in claim 2 including central bearing means beneath and supporting the central portion of the table.

5. A supporting system for an x-y table, comprising a pyramidal array of upper and lower bearings wherein the upper bearings are located inwardly relative to the lower bearings in both x and y directions, half of said bearings extending in the x direction and the other half in the y direction.

6. A drive system for an x-y table comprising two-speed x drive means for driving said table in the x direction and two-speed y drive means for driving said table in the y direction, each of said drive means including:
 a. a drive shaft;
 b. concentric high and low speed drive members coaxial with said drive shaft;
 c. a slip clutch connecting said high speed drive member to said drive shaft;
 d. means mounting said low speed drive member for movement axially of said drive shaft between operative and inoperative positions;
 e. a fixed ring gear coaxial with said drive members;
 f. a planetary gear carried by said low speed drive member and adapted to mesh with said ring gear when said low speed drive member is in said operative position; and
 g. gear means operative when said planetary gear is meshed with said ring gear for providing a driving connection between said low speed drive member and said drive shaft.

7. A drive system as set forth in claim 6 wherein said ring gear is an internally toothed spur gear, and wherein said planetary gear is a spur gear.

* * * * *